Sept. 3, 1935.　　　　W. O'CONNOR　　　　2,013,500
CURTAIN ROLLER BRACKET
Filed July 31, 1934
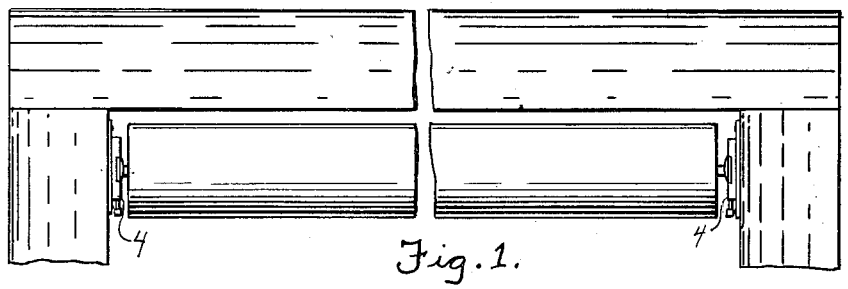
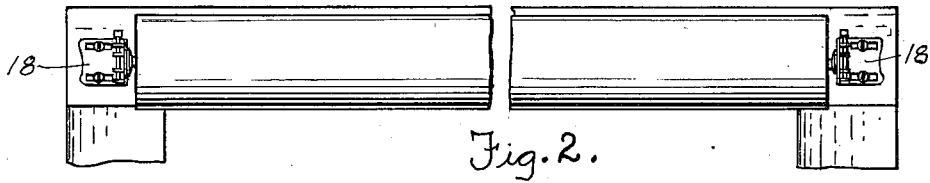
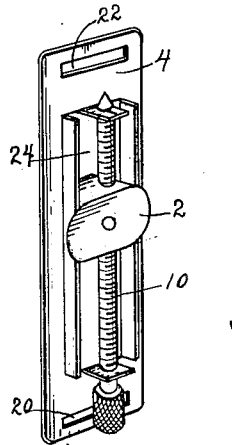
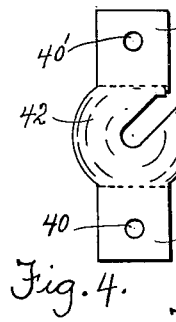
Inventor
William O'Connor
By J. Wesley Everett.
Attorney Patented Sept. 3, 1935

2,013,500

UNITED STATES PATENT OFFICE 2,013,500

CURTAIN ROLLER BRACKET

William O'Connor, Baltimore, Md.

Application July 31, 1934, Serial No. 737,828

2 Claims. (Cl. 248—269)

The present invention relates to window curtain supporting brackets and more particularly to those that may be adapted to vertical adjustment.

It is sometimes rather difficult to secure the ordinary bracket in proper position so that the curtain rod will hang evenly, when the rod is not properly positioned, the shade will be out of plumb with the window casing, therefore an economical and practical adjustable bracket is very desirable.

There are many of these adjustable types now on the market, most of which are too expensive to manufacture, as the mechanism for manipulating them is so involved that they are impractical for general use.

The object of the present invention is to provide a bracket that is composed of a minimum number of parts.

Another object is to provide a bracket in which the workmanship and material will be cheap and economical to construct.

These and other objects will be more clearly and fully described in the detailed description of the accompanying drawing, in which:

Fig. 1 is a front elevation of a portion of a window casing, showing the bracket positioned upon the casing adjacent the shade roller.

Fig. 2 is a front elevation of a portion of a window casing, showing the bracket positioned upon the side of the casing.

Fig. 3 is a perspective view of the type of bracket shown in Fig. 1.

Fig. 4 is a view of the roller supporting member 2, prior to forming the end members 12 and 12'.

Fig. 5 is a view of the base plate 4 in Fig. 3 prior to forming the guide members 6 and 6' and the screw supporting members 8 and 8'.

Fig. 6 is a view of the adjusting screw 10.

Fig. 7 is a section on line 3—3 of Fig. 5.

Fig. 8 is an end of Fig. 4 showing the position of the end members 12 and 12' after they have been formed.

Fig. 9 is a perspective view of the form of bracket as shown in Fig. 2.

Fig. 10 is a section on line 5—5 of Fig. 9.

Fig. 11 is a front view of the member 14 prior to forming the end members 16 and 16'.

Fig. 12 is a front view of the member 14 after forming the ends 16 and 16'.

Fig. 13 is a view of the face plate or base plate 18 in Fig. 9 prior to forming the screw supporting members 46 and 46'.

The form of bracket as shown in Fig. 1 consists of a face plate 4 having horizontal slots 20 and 22 formed adjacent its ends for inserting means for securing the bracket to the window casing. Along the central portion is a vertical slot 24 in which a member 2 may easily pass. Adjacent the opening 24 the side portions of the face plate 4 is turned outwardly at 6 and 6' substantially at right angles to form a guide for the member 2. Adjacent the ends of the slot 24 are members 8 and 8', which are likewise turned outwardly and positioned to receive a threaded screw 10. The members 8 and 8' are each provided with an opening 26 and 26' in which the screw is journaled. The screw 10 has adjacent one of its ends a knurled portion 28 for operating the screw. The portion 30 is preferably provided to operate adjacent the bearing 8' for aiding in supporting the weight of the shade roller. The upper end of the screw is provided with an arrow like head 32 and a reduced portion 34. This reduced portion 34 is supported by the bearing 26'. The bearing 26' is provided with a slot 36. This slot is utilized in assembling the bracket which will be hereinafter more fully described.

In manufacturing the bracket, the face plate 4 is first stamped out as shown in Fig. 5. Forming the horizontal slots 20 and 22 and the vertical slot 24, portions of the face plate are then bent outwardly to form the members 6 and 6', 8 and 8'.

The member 2 is first formed as shown in Fig. 4, the apertures 40 and 40' are threaded to receive the threaded screw 10. The ends 12 and 12' are then bent substantially at right angles to the portion 42.

In assembling the bracket the arrow end of the screw 10 is inserted through the lower aperture 26 of the face plate 4 and screwed into the threaded apertures 40 and and 40' of the roll supporting member 12. The upper end of the screw is then forced through the slot 36 of the bearing 26'.

The roll supporting member 2 may then be caused to travel the length of the vertical slot 24 by rotating the screw 10.

Another form of the invention is shown in Fig. 2 and is more fully shown in detail in Figs. 9, 10, 11, 12 and 13.

The face plate 18 is first formed as shown in Fig. 13, being provided with slots 44 and 44', through which means may be inserted for securing the bracket to the window casing. Also members 46 and 46' are formed adjacent a vertical slot 48 for supporting the roller supporting means.

The roller supporting member 50 is first formed as shown in Fig. 11, the apertures 52 and 52' are threaded to receive the threaded screw 10 and are bent at right angles to the portion 50 as shown in Fig. 12.

The bracket is assembled similar to the manner described for the preceding form, and is best shown in Fig. 10. The member 50 is held adjacent the surface 18 by the operating screw 10. The portions 16 and 16' extending through the plate and being threadably receivable upon the screw 10 which operates upon the opposite of the plate 18.

This type bracket is obviously of cheap and economical construction. The guides and screw supporting members are formed integral with the face plate. The roller supporting means are positioned within the face plate in such a manner that they are well supported within the guides which relieves the strain upon the operating screw.

The bracket can be used equally well on either side of the window casing. In fact, it is preferable, in cases where the shade is heavy to have the operating screw operated from the top as shown in Fig. 2. This will cause the weight to be partly supported by the shoulder 30 as shown in Fig. 6. Otherwise, when the bracket is positioned having the knurled portion of the screw extending downwardly all of the weight will fall upon the bearing 26'.

While I have illustrated and described my invention in its preferred form I do not wish to be limited to these particular disclosures or descriptions of use, as the scope of the invention will be best defined in the following claims.

I claim:

1. A curtain roller supporting bracket having a face plate and means for securing said plate to a supporting member, said plate having a slot therein, bearings for supporting a threaded screw member, said bearings consisting of a portion of the face plate adjacent the ends of the said vertical slot being bent outwardly and provided with suitable bearings therein for receiving the said screw, a curtain rod supporting member having an aperture for receiving a curtain rod shaft and having its end portions extending parallel, the said end portions having therein threaded apertures adapted to receive the said screw, the said parallel members are adapted to fit within the vertical slot and be moved vertically by rotating the screw within the said bearings.

2. A curtain roller supporting bracket having a face plate and means for securing said plate to a supporting member, said plate having a slot therein, bearings for supporting a threaded screw member, said bearings consisting of a portion of the face plate adjacent the end of the said slot being bent outwardly and provided with suitable bearings therein for receiving said screw, a curtain rod supporting member having a portion in which a bearing is formed for receiving a curtain roller shaft, a portion of said curtain roller supporting member being bent to form a pair of guide members for operating within the said slot of the face plate, the said guide members being provided with threaded apertures, threadedly receivable upon said screw member, whereby the said curtain roller supporting member may be moved within said slot by rotating the screw within the screw supporting bearings.

WILLIAM O'CONNOR.